United States Patent
Behrendt et al.

(10) Patent No.: US 9,100,306 B2
(45) Date of Patent: *Aug. 4, 2015

(54) MANAGING CLOUD SERVICES

(75) Inventors: Michael M Behrendt, Randersacker (DE); Gerd Breiter, Wildberg (DE); Stefan Pappe, Heidelberg (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 841 days.

This patent is subject to a terminal disclaimer.

(21) Appl. No.: 13/398,552

(22) Filed: Feb. 16, 2012

(65) Prior Publication Data

US 2013/0219042 A1    Aug. 22, 2013

(51) Int. Cl.
*G06F 15/173* (2006.01)
*H04L 12/26* (2006.01)

(52) U.S. Cl.
CPC .................... *H04L 43/0876* (2013.01)

(58) Field of Classification Search
CPC .............. G06F 9/5072; H04L 43/0876; H04L 41/5096; H04L 67/10; H04L 67/125; H04L 69/40
USPC ........................................................ 709/224
See application file for complete search history.

(56) References Cited

U.S. PATENT DOCUMENTS

| | | | |
|---|---|---|---|
| 8,909,785 B2* | 12/2014 | Franco et al. ................. | 709/226 |
| 8,984,506 B2* | 3/2015 | Fletcher .......................... | 718/1 |
| 2002/0013832 A1* | 1/2002 | Hubbard ....................... | 709/220 |
| 2009/0271324 A1 | 10/2009 | Jandhyala et al. | |
| 2010/0088150 A1 | 4/2010 | Mazhar et al. | |
| 2011/0029673 A1* | 2/2011 | Jaisinghani ................... | 709/226 |
| 2011/0125895 A1* | 5/2011 | Anderson et al. ............. | 709/224 |
| 2011/0295651 A1* | 12/2011 | Pairault et al. ............... | 705/7.36 |
| 2012/0054332 A1* | 3/2012 | Sahu et al. .................... | 709/224 |
| 2013/0111467 A1* | 5/2013 | Sundararaj .................... | 717/176 |
| 2013/0124669 A1* | 5/2013 | Anderson et al. ............. | 709/217 |
| 2013/0151849 A1* | 6/2013 | Graham et al. ............... | 713/164 |
| 2013/0173909 A1* | 7/2013 | Arno et al. .................... | 713/153 |
| 2014/0006580 A1* | 1/2014 | Raghu ............................ | 709/223 |

\* cited by examiner

*Primary Examiner* — Kostas Katsikis
(74) *Attorney, Agent, or Firm* — Garg Law Firm, PLLC; Rakesh Garg; William J. Stock

(57) ABSTRACT

A system, and computer program product for managing cloud services are provided in the illustrative embodiments. A first set of management functions is instantiated external to a microkernel of a management system for managing a set of cloud services. The management system further includes a second set of management functions executing within the kernel of the management system. A subset of the first set of management functions is associated with a cloud service in the set of cloud services. A management task for the cloud service is handled using the subset of the first set of management functions. A usage information corresponding to the use of the subset of the first set of management functions for handling the management task for the cloud service is reported.

13 Claims, 7 Drawing Sheets

MANAGING CLOUD SERVICES

TECHNICAL FIELD

The present invention relates generally to a system, and computer program product for managing a cloud data processing environment. Particularly, the present invention relates to a system, and computer program product for managing the services offered via a cloud data processing environment.

BACKGROUND

Description of the Related Art

Cloud computing is one of the emerging technologies that is enabling flexible and efficient computing. Cloud computing offers an on-demand model for computing that reduces, or in some cases, completely avoids the hardware and software maintenance costs for an end user of the computing services.

Cloud computing also generally has a lower total cost of ownership as compared to captive computing capabilities, such as dedicated/owned data processing systems. The flexibility of using selected computing resources when they are needed, as a service, is a key advantage of cloud computing that endear the cloud model to all types of users, including business enterprises, high power computing groups, and individual users.

Cloud computing is generally offered in several models. Platform as a Service (PaaS) model for cloud computing provides a user with a complete setup on which to execute the user's application or workload. The PaaS model provides an integrated hardware and software architecture that appears as a "platform" on which the user's workloads can execute.

Infrastructure as a Service (IaaS) model of cloud computing, on the other hand, provides the user with a data processing, network, or storage environment per the user's request. In other words, IaaS model provides to the user, for example, "machine time" on a data processing system of the user's desired configuration. Typically, the data processing environment in the IaaS model takes the form of virtual machines (VMs), virtualized storage, or virtualized network, created according to a user-provided specification and allocated to the user for the duration of the user's workload.

Other models that are prevalent in cloud computing environments are Software as a Service (SaaS), and Business Process as a Service (BP-aaS). SaaS, and BP-aaS are cloud delivery models for delivering software and related data, and business processes as services over a data network to the clients. The clients typically access these services using thin client applications, such as a web-browser, reduced computing hardware, or both.

SUMMARY

The illustrative embodiments provide a system, and computer program product for managing cloud services. An embodiment instantiates, in a data processing system using a processor and a memory, a first set of management functions external to a kernel of a management system for managing a set of cloud services, wherein the management system further includes a second set of management functions executing within the kernel of the management system. The embodiment associates a subset of the first set of management functions with a cloud service in the set of cloud services. The embodiment handles a management task for the cloud service using the subset of the first set of management functions. The embodiment reports usage information corresponding to the use of the subset of the first set of management functions for handling the management task for the cloud service.

BRIEF DESCRIPTION OF THE SEVERAL VIEWS OF THE DRAWINGS

The novel features believed characteristic of the embodiments are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION

Figure 1:
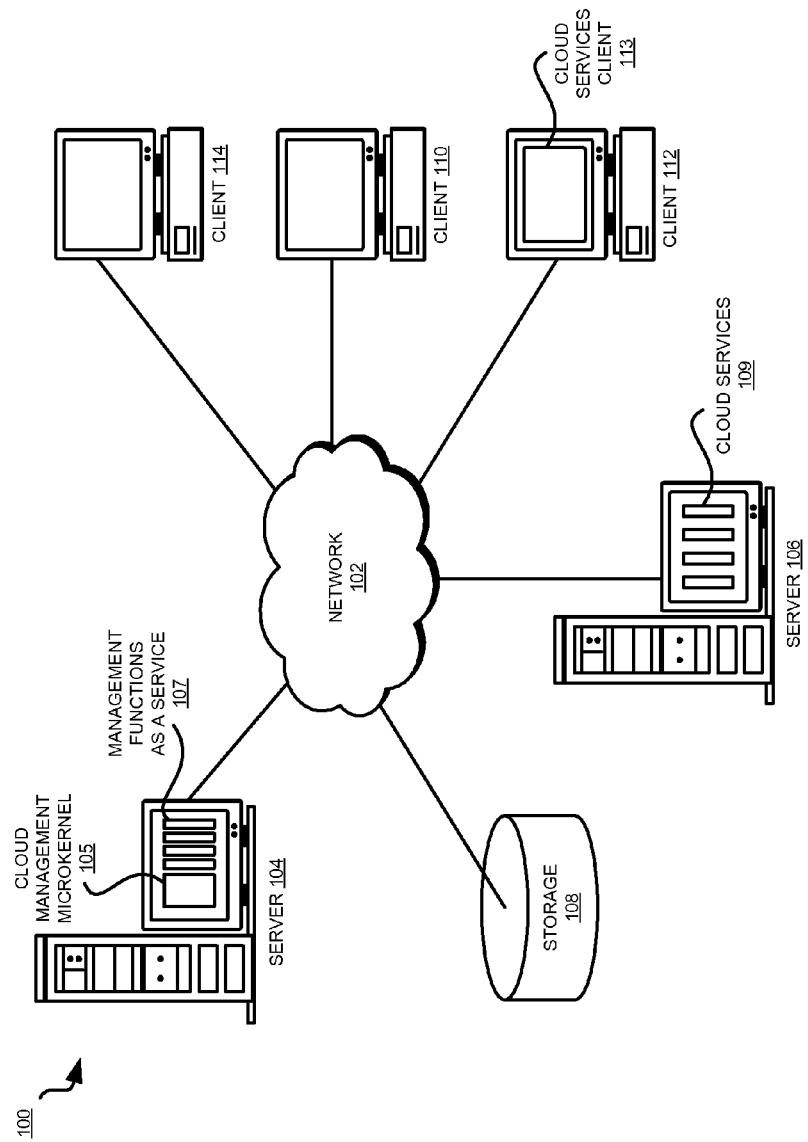
FIG. 1 depicts a pictorial representation of a network of data processing systems in which illustrative embodiments may be implemented.

A typical cloud computing environment supports a diverse group of users, having varying needs, and using varying combinations of the offered cloud services. The illustrative embodiments recognize that in order to implement a cloud service, a set of management functions is generally needed regardless of the specific nature of the cloud service. Typical management functions include provisioning of hardware and software resources for the delivery of various cloud services, monitoring the performance, health and availability of cloud services, metering the usage thereof, entitlement or control of access to those services, accounting, invoicing, incident and problem resolution, and many other similarly purposed management functions.

These and other management functions for managing the delivery of cloud services (management functions) are typically a part of a management platform. The management platform or system executes the management functions across the cloud environment under the control of a system administration staff.

The illustrative embodiments recognize several problems with this manner of managing cloud services using monolithic management systems. For example, the illustrative embodiments recognize that such a management system itself has to be managed as well. For example, a monolithic management system has to be monitored for errors, performance degradations, faults, disruptions, requiring a patch or upgrade, backups, routine administration functions, or variations from acceptable performance parameters (collectively, management tasks or events, or singular management task or event). Such monitoring and management of the management system is needed to allow an administrator to react to the management task in the management system, keep the management system operational, or handle other management tasks, so that the management of the otherwise healthy cloud services can continue.

Managing a management system requires additional management tools. As the illustrative embodiments recognize, in a typical cloud environment, a daisy chain of management systems and tools, and associated personnel, are needed to manage the cloud services. This model of managing cloud services is technologically and personnel-wise complex and cost-intensive.

Furthermore, the management system itself could be a service, which the cloud provider procures from another vendor. Whether the management system is locally installed on a data processing system in the cloud infrastructure or procured as a service, the illustrative embodiments recognize that the cloud provider incurs a cost for operating the management system. The illustrative embodiments recognize that when a monolithic management system manages multiple cloud services for multiple clients, allocating the cost of operating the management system becomes a difficult process for the cloud provider. Thus, the illustrative embodiments recognize that presently, whether installed or consumed as a service, a management system is cost intensive, which cost is difficult to recover through fair allocation to cloud services clients. The illustrative embodiments recognize that presently, management functions are provided from macrokernel (monolithic) management system.

A microkernel architecture is an architecture where a very small, minimalistic kernel, having just enough functionality to execute certain operating systems acts as the operating system, and other functions are implemented as services outside of the kernel. A macrokernel is a larger kernel module, where the operating systems capabilities are implemented and executed within the kernel. A monolithic management system follows the macrokernel philosophy in implementing the management functions within the system (as a monolith). Hence, a monolithic management system can be regarded as a macrokernel management system.

For the reasons recognized by the illustrative embodiments above, a macrokernel management system is not self-managing and requires other—external—management tools for managing the macrokernel management system in a recursive manner. The management functions are also not readily dissociated from the macrokernel management system and associated with specific sets of cloud services, such as per service, per client, or a combination thereof, which they manage. For this reason, the cost of operating a macrokernel management system is also not easily attributable to the cloud services, clients, or a combination thereof, being managed.

The illustrative embodiments used to describe the invention generally address and solve the above-described problems and other problems related to managing cloud computing environments. The illustrative embodiments provide an improved system, and computer program product for managing cloud services.

Generally, the illustrative embodiments provide a management system architected based on the microkernel philosophy. A microkernel management system (cloud management microkernel) implements the management functions external to a core of minimal functions. The externally implemented management functions can be instantiated relative to a cloud service, a client, or a combination thereof. An embodiment enables measuring the usage of an instance of a management function relative to a cloud service, a client, or a combination thereof, thereby enabling allocation of costs of that usage to that service, client, or combination thereof.

An embodiment provides some management functions within the core of the cloud management microkernel in a manner that the management functions within the microkernel can manage the instances of the external management functions. Thus, an embodiment provides for a management function inside the microkernel managing another peer management function external to the microkernel.

The illustrative embodiments are described with respect to certain management functions only as examples. Such descriptions are not intended to be limiting on the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention.

The illustrative embodiments are further described with respect to certain applications only as examples. Such descriptions are not intended to be limiting on the invention. An embodiment of the invention may be implemented with respect to any type of application, such as, for example, applications that are served, the instances of any type of server application, a platform application, a stand-alone application, an administration application, or a combination thereof.

An application, including an application implementing all or part of an embodiment, may further include data objects, code objects, encapsulated instructions, application fragments, services, and other types of resources available in a data processing environment. For example, a Java® object, an Enterprise Java Bean (EJB), a servlet, or an applet may be manifestations of an application with respect to which the invention may be implemented. (Java and all Java-based trademarks and logos are trademarks or registered trademarks of Oracle and/or its affiliates).

An illustrative embodiment may be implemented in hardware, software, or a combination thereof. An illustrative embodiment may further be implemented with respect to any type of cloud computing environment, such as a physical or virtual data processing system or components thereof, that may be available in a given cloud computing environment.

The illustrative embodiments are described using specific code, designs, architectures, layouts, schematics, and tools only as examples and are not limiting on the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures.

The examples in this disclosure are used only for the clarity of the description and are not limiting on the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting on the illustrative embodiments. Additional or different advantages may be realized by specific illustrative embodiments. Furthermore, a particular illustrative embodiment may have some, all, or none of the advantages listed above.

Figure 2:
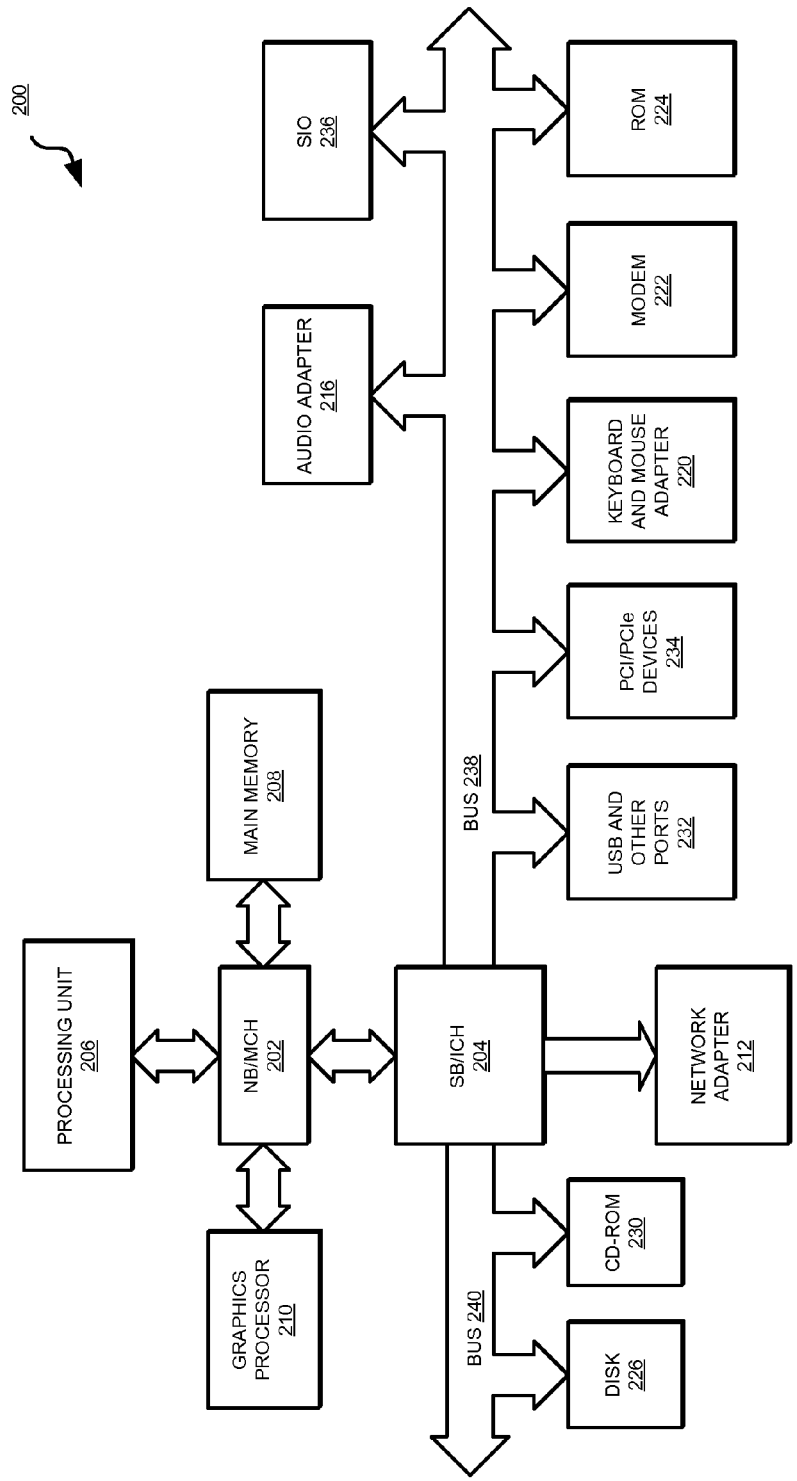
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Some elements depicted in this figure, such as server 104, server 106, storage 108, and part of network 102, may comprise a cloud computing environment (cloud). A data processing system associated with the cloud, such as server 104, may include cloud management microkernel 105 according to an embodiment. Management functions as service 107 may be a set of instances of management functions implemented external to cloud management microkernel 105 according to an embodiment. Management functions as service 107 and cloud management microkernel 105 may execute on same or different data processing systems within the scope of the illustrative embodiments. Cloud services 109 may be a set of cloud services offered to cloud services client 113.

Any number of data processing systems, such as servers 104 and 106, storage unit 108, and clients 110, 112, and 114, may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, in which computer usable program code or instructions implementing the processes of the illustrative embodiments may be located for the illustrative embodiments.

In the depicted example, data processing system 200 employs a hub architecture including North Bridge and memory controller hub (NB/MCH) 202 and south bridge and input/output (I/O) controller hub (SB/ICH) 204. Processing unit 206, main memory 208, and graphics processor 210 are coupled to north bridge and memory controller hub (NB/MCH) 202. Processing unit 206 may contain one or more processors and may be implemented using one or more heterogeneous processor systems. Graphics processor 210 may be coupled to the NB/MCH through an accelerated graphics port (AGP) in certain implementations.

In the depicted example, local area network (LAN) adapter 212 is coupled to south bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238. Hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub (SB/ICH) 204.

An operating system runs on processing unit 206. The operating system coordinates and provides control of various components within data processing system 200 in FIG. 2. The operating system may be a commercially available operating system such as Microsoft® Windows® (Microsoft and Windows are trademarks of Microsoft Corporation in the United States, other countries, or both), or Linux® (Linux is a trademark of Linus Torvalds in the United States, other countries, or both). An object oriented programming system, such as the Java™ programming system, may run in conjunction with the operating system and provides calls to the operating system from Java™ programs or applications executing on data processing system 200 (Java and all Java-based trademarks and logos are trademarks or registered trademarks of Oracle and/or its affiliates).

Program instructions for the operating system, the object-oriented programming system, the processes of the illustrative embodiments, and applications or programs are located on storage devices, such as hard disk drive 226, and may be loaded into a memory, such as, for example, main memory 208, read only memory 224, or one or more peripheral devices, for execution by processing unit 206. Program instructions may also be stored permanently in non-volatile memory and either loaded from there or executed in place.

For example, the synthesized program according to an embodiment can be stored in non-volatile memory and loaded from there into DRAM.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in north bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
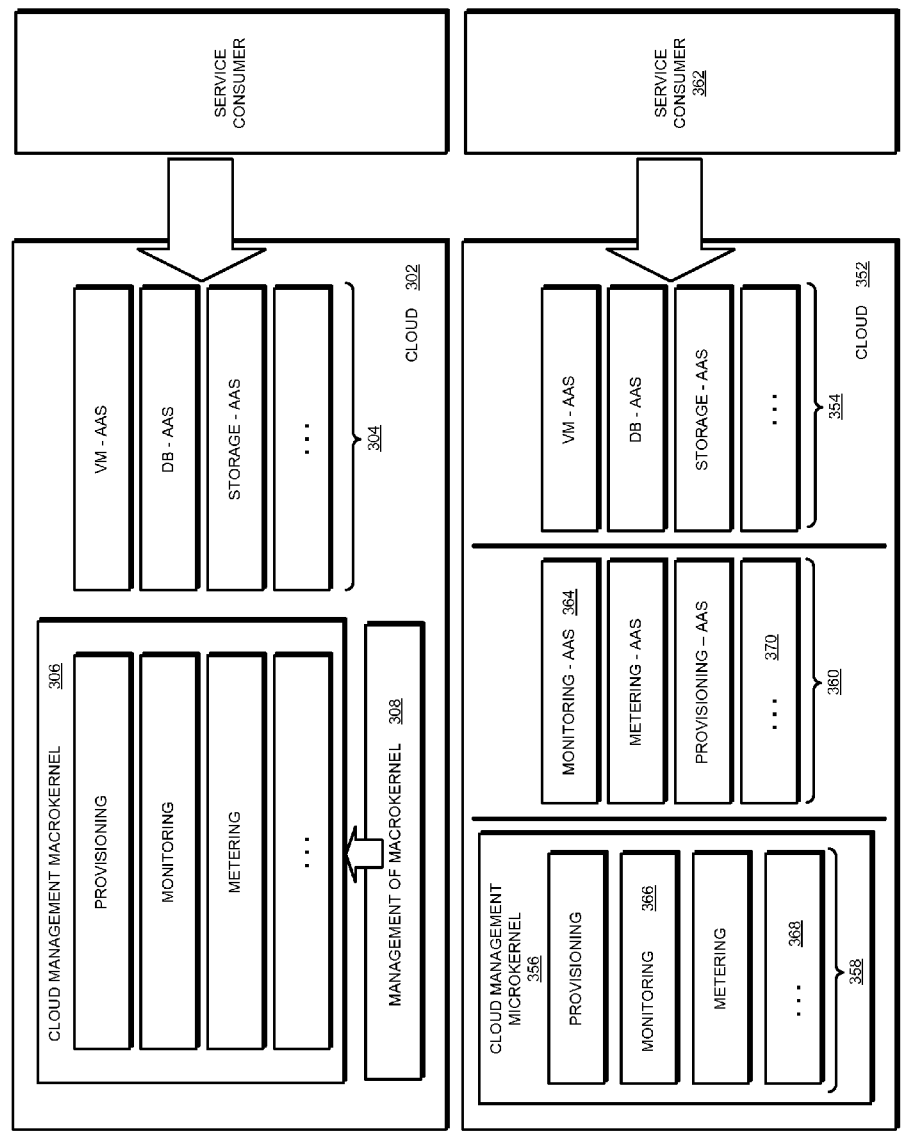
FIG. 3 depicts an example configuration for managing cloud services in accordance with an illustrative embodiment.

With reference to FIG. 3, this figure depicts an example configuration for managing cloud services in accordance with an illustrative embodiment. Cloud 302 may be a cloud including a set of data processing systems, software, and networking components, such as server 104, server 106, storage 108, and part of network 102 in FIG. 1.

Cloud 302 includes the presently used configuration for managing cloud services. Cloud 302 offers cloud services 304 to one or more service customers (clients). Cloud management macrokernel 306 may be a monolithic management system for managing cloud services 304. Management tool 308 is used to manage cloud management macrokernel 306. Cloud management macrokernel 306 implements management functions 310 for managing cloud service 306.

Cloud 352 is analogous to cloud 302; cloud services 354 are analogous to cloud services 304. Cloud 352 includes a configuration for managing cloud services according to an embodiment.

Cloud management microkernel 356 is a modified form of cloud management macrokernel 306. Cloud management microkernel 356 implements management functions 358 so that they execute within the kernel of cloud management microkernel 356. For example, a version of provisioning, monitoring, and metering management functions may execute within cloud management microkernel 356 as management functions 358.

Management functions 360 are implementations of certain management functions external to cloud management microkernel 356, and can be instantiated as services in the manner of cloud services 354. Furthermore, because of the ability of offering management functions 360 as services in cloud 352, any of management functions 360 can be associated with any of cloud services 354 for enabling the cloud services provider an improved control over the cost and effort of managing cloud services 354. As an additional advantage, a cloud services provider can also associate management functions 360 with a combination of one or more client 362 and one or more cloud services 354 to recoup allocable cost of managing cloud services 354 on behalf of clients 362.

Additionally, management functions 358 and management functions 360 can collaborate to manage each other. For example, a failure in monitoring management function 364 can be monitored using monitoring management function 366 and remedied or handled using management function 368 or 370.

Figure 4:
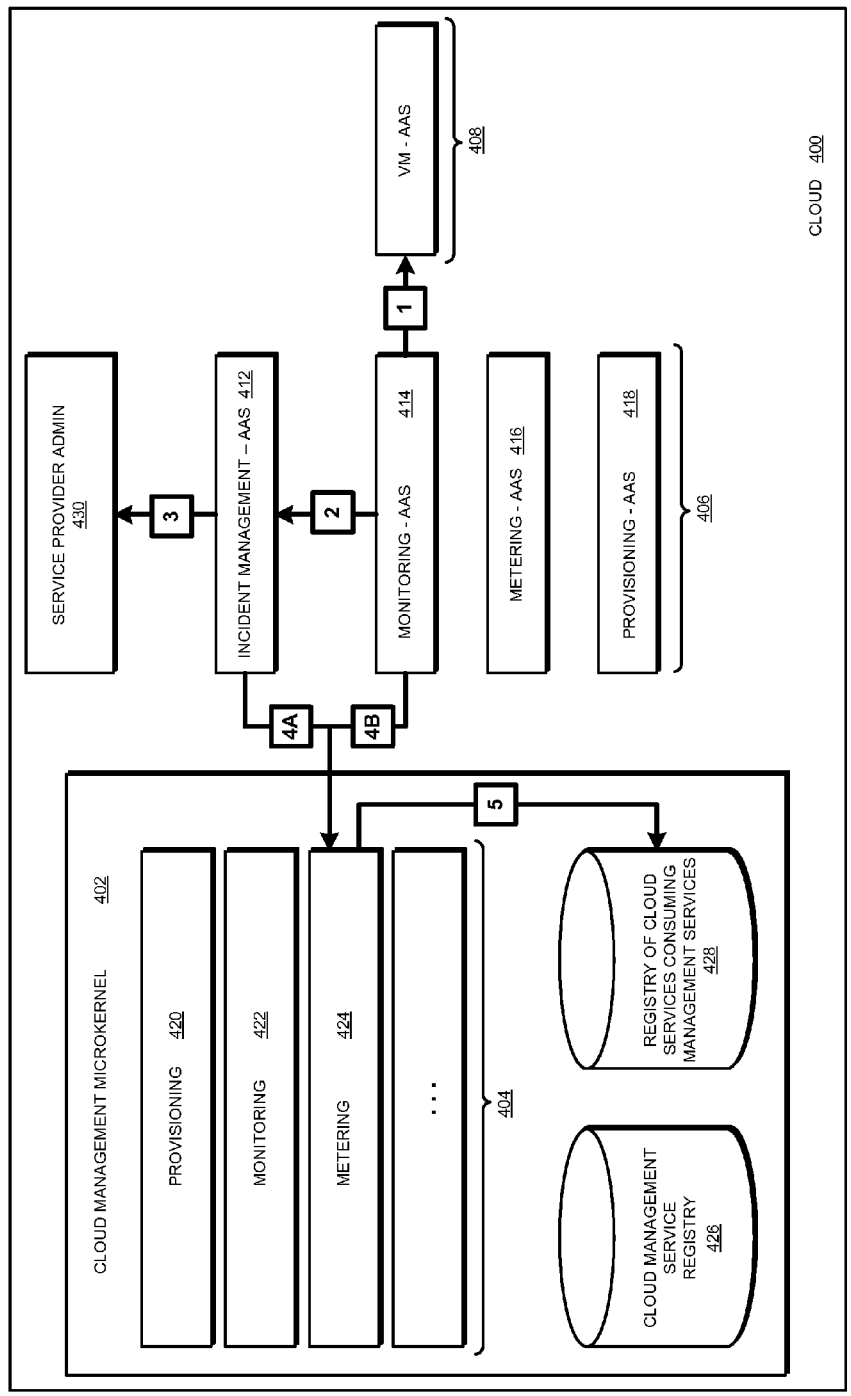
FIG. 4 depicts a block diagram of managing a cloud service using a cloud management microkernel in accordance with an illustrative embodiment.

With reference to FIG. 4, this figure depicts a block diagram of managing a cloud service using a cloud management microkernel in accordance with an illustrative embodiment. Cloud 400 is analogous to cloud 302 in FIG. 3. Cloud management microkernel 402 is analogous to cloud management microkernel 352 in FIG. 3. Management functions 404 are management functions implemented to execute within cloud management microkernel 402. Management functions 406 are management functions implemented to be instantiated and executed outside of cloud management microkernel 402, as services. Cloud service 408 is an example VM as a Service (VM-aaS) assigned to a client (not shown). Management functions 406 are associated with cloud service 408 and manage cloud service 408.

As an example to illustrate the operation of an embodiment, assume that management functions 406 include incident management function 412, monitoring management function 414, metering management function 416, and provisioning management function 418. As an example, management functions 404 include provisioning management function 420, monitoring management function 422, and metering management function 424.

Cloud mgmt service registry 426 is a record of management functions 406 that are available for instantiation in cloud 400. Cloud services registry 428 is a record of cloud service 408 and other similarly available cloud services in cloud 400 that consume—can be associated with, managed using, or otherwise used with—management functions 406. Registries 426 and 428 can be records, repositories, files, databases, or another type of data storage suitable for a given implementation.

In one embodiment, registry 428 can perform an additional book-keeping function by including log records of occasions when cloud service 408 uses one or more of management functions 406 (metering the usage). In another embodiment, such logs of management functions 406's usage can be maintained in another repository, such as a log-file or a billing database.

During operation in the example setup depicted in FIG. 4, assume that cloud service 408 suffers a failure. Monitoring management function 414 detects the failure in cloud service 408 (step labeled "1"). Monitoring management function 414 communicates the failure to incident management function 412 (step labeled "2"). Incident management function 412 may notify administrator 430, which may be a person or an application for administrating a portion of cloud 400.

In one embodiment, incident management function 412 may spend computing resources to remedy the failure in cloud service 408. In another embodiment, incident management function 412 may collect information usable by administrator 430 to remedy the failure in cloud service 408. Regardless of the particular operations executed in management functions 412 and 414 to monitor and resolve the failure, management functions 412 and 414 are being used relative to cloud service 408 during the failure. Thus, management functions 412 and 414 report their respective usage information (steps "4a" and "4b" respectively).

As an example, where a billing model in cloud 400 bills a client according to a period of usage of management functions 406, the usage information reported in steps 4a and 4b may include a time period, and other suitable measurement parameters, during which management functions 412 and 414 were associated with monitoring and resolving the failure of cloud service 408. Furthermore, steps 4a and 4b are depicted as reporting into registry 428 only as an example. The reporting of steps 4a and 4b can be directed to any suitable repository of usage information in a similar manner within the scope of the illustrative embodiments.

Figure 5:
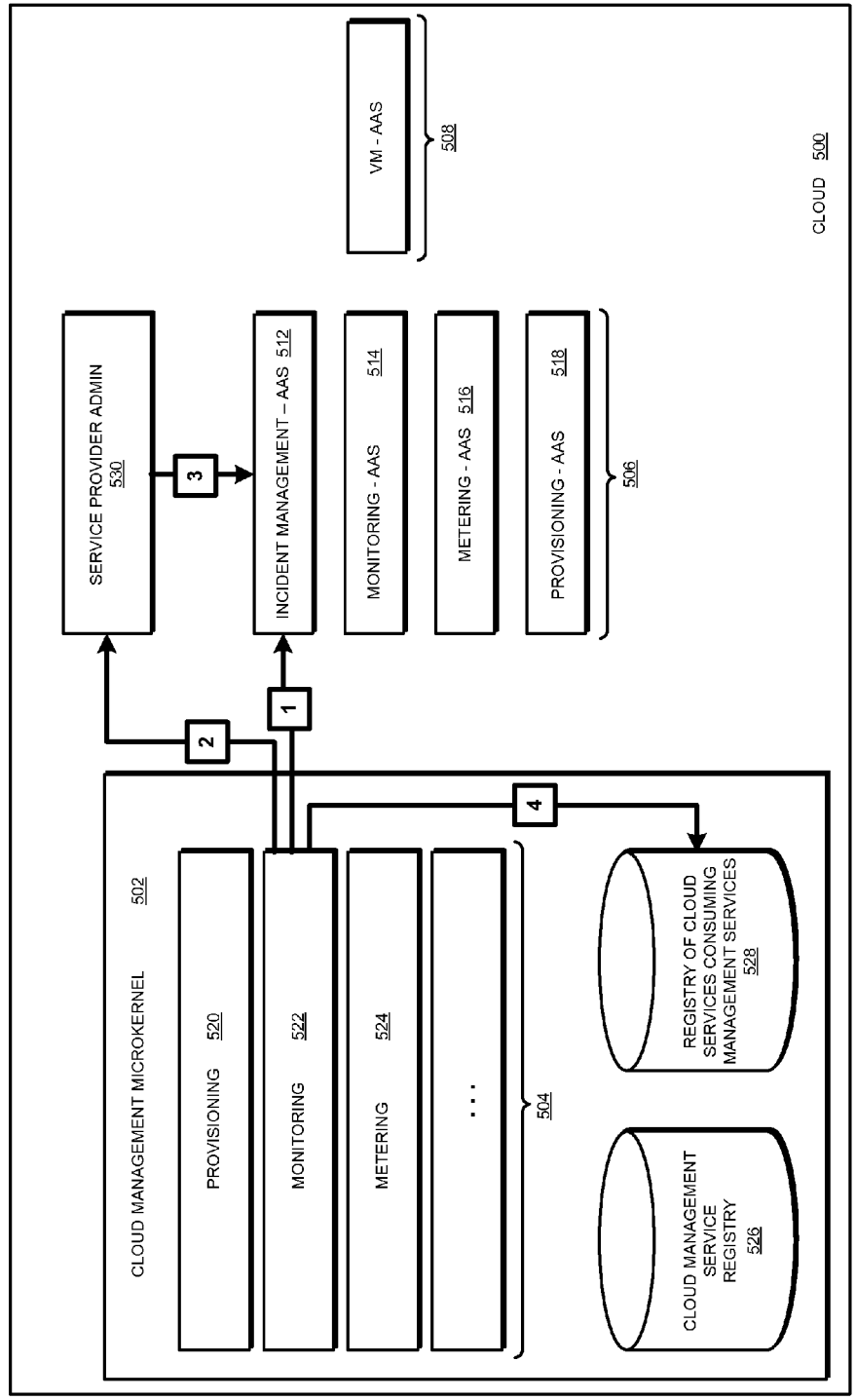
FIG. 5 depicts a block diagram of managing a management function service of a cloud management microkernel in accordance with an illustrative embodiment.

With reference to FIG. 5, this figure depicts a block diagram of managing a management function service of a cloud management microkernel in accordance with an illustrative embodiment. Cloud 500 is analogous to cloud 400 in FIG. 4. Cloud management microkernel 502 is analogous to cloud management microkernel 402 in FIG. 4. Depicted elements 504-530 in FIG. 5 are analogous to corresponding elements 404-430 in FIG. 4.

During operation in the example setup depicted in FIG. 5, assume that a management function 512 requires an update—a management task. As an example, management function 512 may be an incident management function. Another management function 522, such as a monitoring management function, detects a failure in management function 512 (step labeled "1"), resulting in a management task (in this case for managing the detected failure/incident). Management function 522 communicates the management task to administrator 530 (step labeled "2"). Administrator 530, whether a person or an application, acts to address the failure in management function 512 (step "3"). While management function 522 monitors the management functions, and administrator 530 resolves the failure, management function 522 reports the usage information (step "4"). As an example, where a billing model in cloud 500 bills a client according to a period of usage of management functions 506, the usage information reported in step 4 may include a time period, other suitable measurement parameters, or a combination thereof, during which management function 522 was associated with monitoring and resolving the failure of cloud service 508. Step 4 is depicted as reporting into registry 528 only as an example. The reporting of step 4 can be directed to any suitable repository of usage information in a similar manner within the scope of the illustrative embodiments.

The example management functions depicted in FIGS. 4 and 5, within their respective cloud management microkernels as well as external to their respective cloud management microkernels are only example management functions used to describe the operation of certain embodiments. Similarly, the management task, and the monitoring and resolution operations relative to failures are also illustrative examples. The example management functions, the example management tasks, the example failures, and the example management operations are not limiting on the illustrative embodiments. Those of ordinary skill in the art will be able to conceive many other management functions, failures, operations, or combinations thereof from this disclosure, and the same are contemplated within the scope of the illustrative embodiments.

Figure 6:
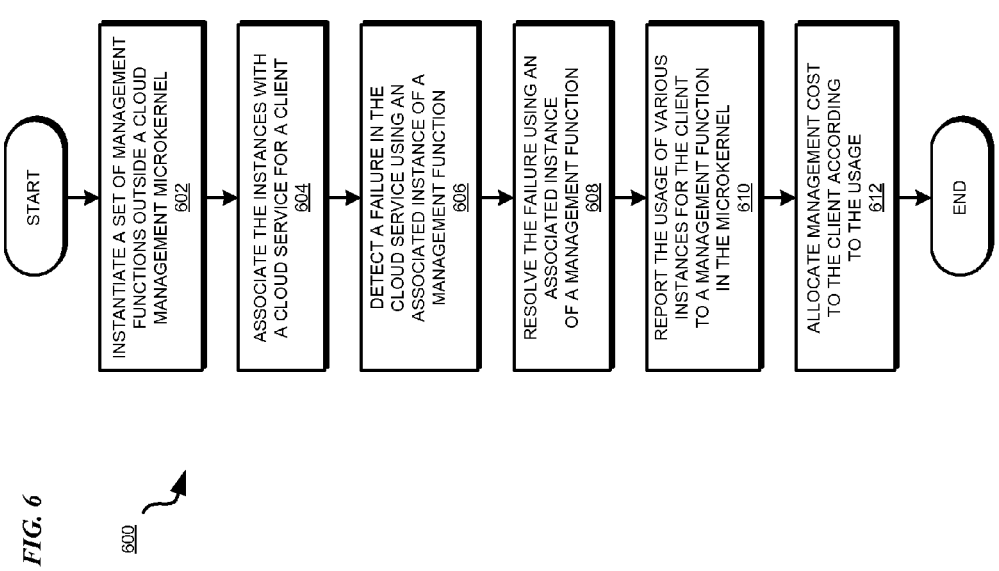
FIG. 6 depicts a flowchart of an example process of managing cloud services with management function cost allocation in accordance with an illustrative embodiment.

With reference to FIG. 6, this figure depicts a flowchart of an example process of managing cloud services with management function cost allocation in accordance with an illustrative embodiment. Process 600 can be implemented in a cloud management microkernel in a cloud computing environment, such as cloud management microkernel 502 in FIG. 5.

Process 600 begins by instantiating a set of management functions external to a cloud management microkernel (step 602). Process 600 associates the set of instances with a cloud service for a client (step 604).

Process 600 detects a failure in the cloud service using an associated instance of a management function (step 606). Process 600 resolves the failure using an instance of management function from the set of instances (step 608). The instances used in steps 606 and 608 may be same or different depending upon specific implementation within the scope of the illustrative embodiments.

Process 600 reports the usage of various instances for the client to a management function in the cloud management microkernel (step 610). Process 600 allocates a portion of the management cost to the client according to the usage (step 612). Process 600 ends thereafter.

Figure 7:
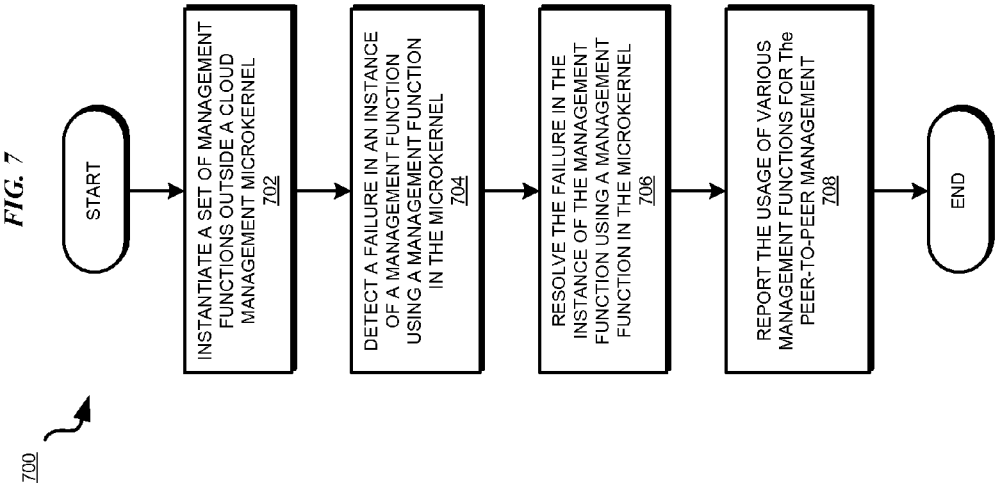
FIG. 7 depicts a flowchart of a process of managing the management functions in accordance with an illustrative embodiment.

With reference to FIG. 7, this figure depicts a flowchart of a process of managing the management functions in accordance with an illustrative embodiment. Process 700 may be implemented in a cloud management microkernel, such as cloud management microkernel 502 in FIG. 5.

Process 700 begins by instantiating a set of management functions external to the cloud management microkernel (step 702). Process 700 detects a failure in an instance of a management function using a management function in the cloud management microkernel (step 704). Process 700 resolves the failure in the instance using a management function in the cloud management microkernel (step 706). In one embodiment, process 700 may resolve the failure using a management function in the cloud management microkernel, an instance of a management function external to the cloud management microkernel, or a combination thereof.

Process 700 may, optionally, report the usage of various management functions, both internal and external to the cloud management microkernel, for the management (step 708). Process 700 ends thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, a system, and computer program product are provided in the illustrative embodiments for managing cloud services. Using an embodiment of the invention, the cost of managing the cloud services can be allocated to the cloud services, the clients, or a combination thereof, which use certain management functions. A cloud management microkernel implements management functions in such a way that the management functions can self-manage each other without requiring additional management tools to manage the microkernel management system.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage device(s) or computer readable media having computer readable program code embodied thereon.

Any combination of one or more computer readable storage device(s) or computer readable media may be utilized. The computer readable medium may be a computer readable signal medium or a computer readable storage medium. A computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible device or medium that can contain, or store a program for use by or in connection with an instruction execution system, apparatus, or device.

Program code embodied on a computer readable storage device or computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to one or more processors of one or more general purpose computers, special purpose computers, or other programmable data processing apparatuses to produce a machine, such that the instructions, which execute via the one or more processors of the computers or other programmable data processing apparatuses, create means for implementing the functions/acts specified in the flowchart and/or block diagram block or blocks.

These computer program instructions may also be stored in one or more computer readable storage devices or computer readable that can direct one or more computers, one or more other programmable data processing apparatuses, or one or more other devices to function in a particular manner, such that the instructions stored in the one or more computer readable storage devices or computer readable medium produce an article of manufacture including instructions which implement the function/act specified in the flowchart and/or block diagram block or blocks.

The computer program instructions may also be loaded onto one or more computers, one or more other programmable data processing apparatuses, or one or more other devices to cause a series of operational steps to be performed on the one or more computers, one or more other programmable data processing apparatuses, or one or more other devices to produce a computer implemented process such that the instructions which execute on the one or more computers, one or more other programmable data processing apparatuses, or one or more other devices provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein a set includes one or more members unless the context clearly indicates otherwise. As used herein a subset can include all or part of a set unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A data processing system for managing cloud services, the data processing system comprising:
a storage device including a storage medium, wherein the storage device stores computer usable program code; and
a processor, wherein the processor executes the computer usable program code, and wherein the computer usable program code comprises:

computer usable code for instantiating in a data processing system using a processor and a memory, a first set of management functions external to a kernel of a management system for managing a set of cloud services, wherein the management system further includes a second set of management functions executing within the kernel of the management system;

computer usable code for computer usable code for associating a subset of the first set of management functions with a cloud service in the set of cloud services;

computer usable code for handling a management task for the cloud service using the subset of the first set of management functions;

computer usable code for reporting a usage information corresponding to the use of the subset of the first set of management functions for handling the management task for the cloud service; and computer usable code for managing, using a management function from the second set of management functions, a management function in the subset of the first set of management functions.

2. The data processing system of claim 1, further comprising:

computer usable code for allocating according to the usage information, a portion of a cost of operating the management system to the cloud service.

3. The data processing system of claim 1, wherein the management task includes handling a failure, and wherein the computer usable code for handling further comprises:

computer usable code for detecting the failure using a first management function in the subset of the first management functions;

computer usable code for collecting using a second management function in the subset of the first management functions, information usable for the handling.

4. The data processing system of claim 1, further comprising:

computer usable code for detecting, using a member management function of the second set of management functions, a second management task in a member management function of the first set of management functions;

computer usable code for reporting a second usage information corresponding to the use of the member of the second set of management function for detecting the second management task.

5. A computer usable program product comprising a computer usable storage device including computer usable code for managing cloud services, the computer usable code comprising:

computer usable code for instantiating in a data processing system using a processor and a memory, a first set of management functions external to a kernel of a management system for managing a set of cloud services, wherein the management system further includes a second set of management functions executing within the kernel of the management system;

computer usable code for computer usable code for associating a subset of the first set of management functions with a cloud service in the set of cloud services;

computer usable code for handling a management task for the cloud service using the subset of the first set of management functions; and computer usable code for reporting a usage information corresponding to the use of the subset of the first set of management functions for handling the management task for the cloud service; and computer usable code for managing, using a management function from the second set of management functions, a management function in the subset of the first set of management functions.

6. The computer usable program product of claim 5, wherein the kernel is constructed as a microkernel.

7. The computer usable program product of claim 5, wherein the computer usable code is stored in a computer readable storage medium in a data processing system, and wherein the computer usable code is transferred over a network from a remote data processing system.

8. The computer usable program product of claim 5, wherein the computer usable code is stored in a computer readable storage medium in a server data processing system, and wherein the computer usable code is downloaded over a network to a remote data processing system for use in a computer readable storage medium associated with the remote data processing system.

9. The computer usable program product of claim 5, further comprising:

computer usable code for allocating according to the usage information, a portion of a cost of operating the management system to the cloud service.

10. The computer usable program product of claim 5, wherein the management task includes handling a failure, and wherein the computer usable code for handling further comprises:

computer usable code for detecting the failure using a first management function in the subset of the first management functions;

computer usable code for collecting, using a second management function in the subset of the first management functions, information usable for the handling.

11. The computer usable program product of claim 5, further comprising:

computer usable code for detecting, using a member management function of the second set of management functions, a second management task in a member management function of the first set of management functions;

computer usable code for reporting a second usage information corresponding to the use of the member of the second set of management function for detecting the second management task.

12. The computer usable program product of claim 11, wherein the second management task is a need for an update in the member management function of the first set of management functions.

13. The computer usable program product of claim 5, wherein the management task includes handling an error condition in the cloud service.

* * * * *